United States Patent [19]

Gabrys

[11] 4,150,931

[45] Apr. 24, 1979

[54] INJECTION MOLDING APPARATUS WITH QUICK CHANGE MOLDS

[75] Inventor: Kenneth F. Gabrys, Streamwood, Ill.

[73] Assignee: The Pentaject Corporation, Algonquin, Ill.

[21] Appl. No.: 838,645

[22] Filed: Oct. 3, 1977

[51] Int. Cl.² .............................................. B29C 1/16
[52] U.S. Cl. .................................. 425/186; 425/192 R
[58] Field of Search .................. 425/192 R, 183, 186, 425/574, 575, 576, 567, 190; 249/102, 139, 120

[56] References Cited

U.S. PATENT DOCUMENTS

| | | | |
|---|---|---|---|
| 2,828,508 | 4/1958 | Labarre | 425/576 X |
| 3,024,498 | 3/1962 | Bronnenkant et al. | 425/574 X |
| 3,070,391 | 12/1962 | Hofmann | 425/192 X |
| 3,108,326 | 10/1963 | Thiel | 425/192 |
| 3,350,748 | 11/1967 | McIlvin | 425/192 |
| 3,993,787 | 11/1976 | Nakabayash et al. | 425/575 X |

*Primary Examiner*—William R. Briggs
*Attorney, Agent, or Firm*—Leydig, Voit, Osann, Mayer & Holt, Ltd.

[57] ABSTRACT

Three molds are formed with bayonet-type couplings adapted to interlock releasably with bayonet-type sockets in a holding plate to enable the molds to be quickly attached to and released from the holding plate. A key fits releasably into keyways in the molds and holds all three molds against turning after the molds have been attached to the holding plate.

9 Claims, 5 Drawing Figures

U.S. Patent   Apr. 24, 1979   4,150,931
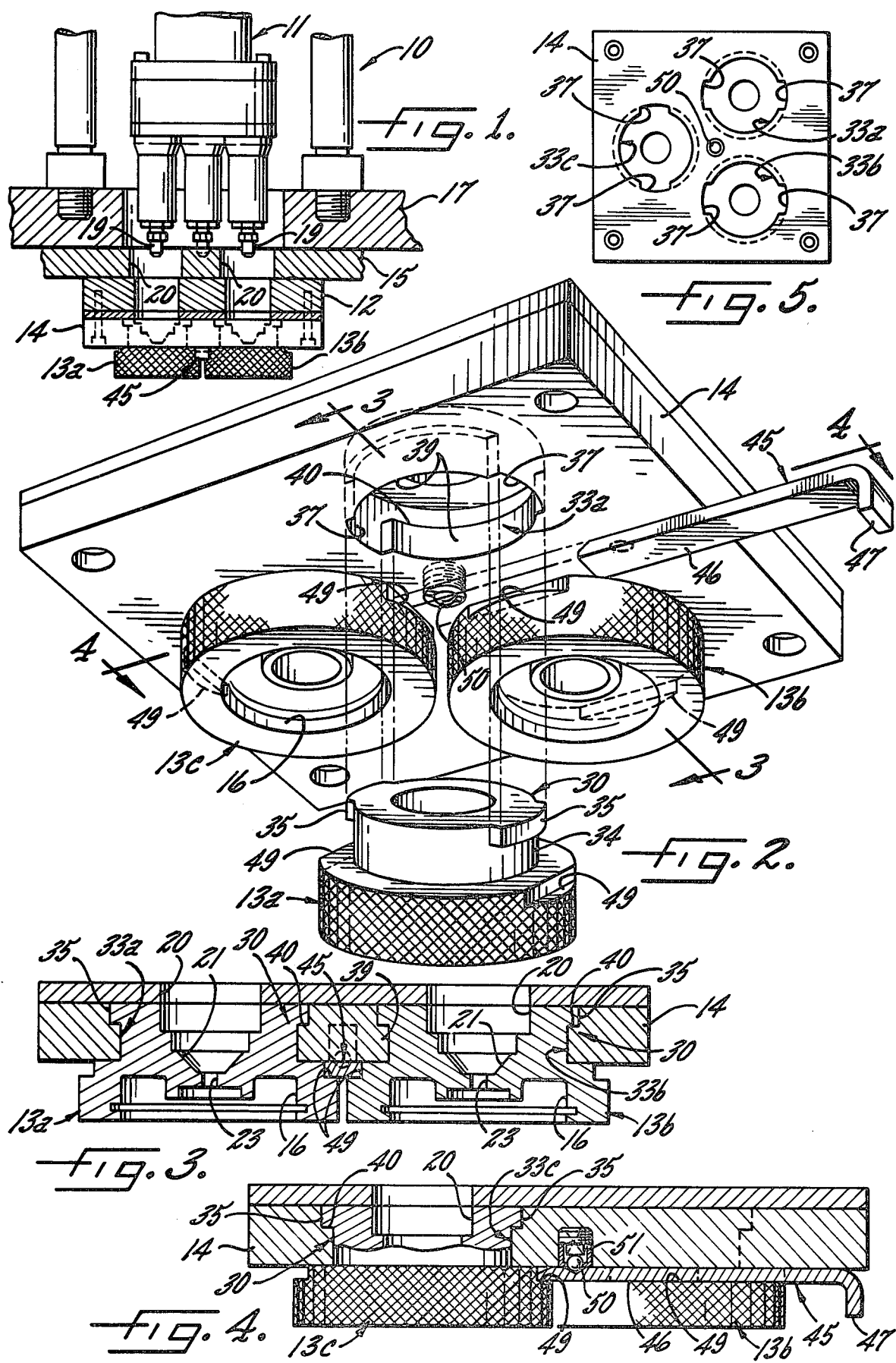

INJECTION MOLDING APPARATUS WITH QUICK CHANGE MOLDS

BACKGROUND OF THE INVENTION

This invention relates to molding apparatus of the type in which molding material is injected into one or more mold sets to form one or more molded articles. More particularly, the invention relates to apparatus in which each of the mold sets comprises upper and lower molds adapted to be opened and closed relative to one another and adapted to be attached releasably to holding plates. When the apparatus is changed over to mold articles of a different type, the molds are detached from the holding plates and are replaced with different molds.

SUMMARY OF THE INVENTION

The general aim of the present invention is to provide new and improved molding apparatus in which the molds can be changed over in a quicker and easier manner than has been possible heretofore.

A further object is to achieve the foregoing by providing molding apparatus in which the holding plates and the molds are formed with bayonet-type sockets and couplings which enable the molds to be telescoped with the holding plates and then turned to locked positions and automatically secured to the holding plates, the reverse procedure being followed to detach the molds from the holding plates.

An important object of the invention is to provide molding apparatus in which a single key acts in a unique manner to hold a plurality of molds in their locked positions and may be easily released to enable the molds to be turned and released from the holding plates.

These and other objects and advantages of the invention will become more apparent from the following detailed description when taken in conjunction with the accompanying drawings.

BRIEF DESCRIPTION OF THE DRAWINGS

FIG. 1 is a fragmentary front elevational view of new and improved injection molding apparatus incorporating the unique features of the present invention.

FIG. 2 is an enlarged perspective view of part of the apparatus shown in FIG. 1, the locking key and one of the molds being shown in an exploded manner.

FIGS. 3 and 4 are cross-sectional views taken substantially along the lines 3—3 and 4—4, respectively, of FIG. 2.

FIG. 5 is a bottom plan view, on a reduced scale, of the holding plate shown in FIG. 2.

DETAILED DESCRIPTION OF THE PREFERRED EMBODIMENT

As shown in the drawings for purposes of illustration, the invention is embodied in an injection molding machine 10 of the type in which molding material such as rubber is delivered under pressure from an injector 11 into one or more mold sets to form a molded part or parts. Herein, the machine is shown as including three identical mold sets which are constituted in part by upper mold members 13a, 13b and 13c secured to and located beneath a holding plate 14. The latter, in turn, is fastened beneath an electrically heated platen 12 which is secured to an overlying stationary support 15. The mold sets further include three lower molds (not shown) which are alined vertically with the upper molds 13a, 13b and 13c, which are secured to a lower holding plate (not shown) and which are adapted to be opened and closed with respect to the upper molds. When the molds are closed, cavities 16 (FIG. 3) in the upper molds and cavities in the lower molds receive the molding material and shape into articles of desired size and configuration.

The injector 11 is supported in a conventional manner on a main frame 17 (FIG. 1) to move between raised and lowered positions during each injection cycle. When the injector is moved to its lowered position, three nozzles 19 on the lower end of the injector pass through holes 20 in the support 15, the platen 12 and the holding plate 14 and seat against the bottoms of holes 21 (FIG. 3) formed in the upper ends of the upper molds 13a, 13b and 13c. Molding material then is delivered from the nozzles and flows into the cavities 16 by way of sprues 23 formed in the upper molds.

When the machine 10 is changed over to mold parts of a different size, shape or type, the molds 13a, 13b and 13c are detached from the upper holding plate 14 and are replaced with molds having different cavities 16. The lower molds also are detached from the lower holding plate and are replaced with different molds.

In accordance with the present invention, the molds 13a, 13b and 13c and the holding plate 14 are constructed in a unique manner to enable the molds to be quickly and easily attached to and removed from the holding plate so that changing over of the molds may be accomplished in a comparatively short period of time. Herein, this is achieved by forming the molds and the holding plate with bayonet joints which permit the molds to be telescoped with the holding plate and then turned and secured to the holding plate.

More specifically, the bayonet joints include bayonet-type couplings 30 and bayonet-type sockets 33. In this particular instance, the couplings are formed on the upper ends of the molds 13a, 13b and 13c while the sockets are formed in and open downwardly from the lower side of the holding plate 14.

As shown in FIG. 2, each coupling comprises a collar 34 located on the upper end of each mold 13a, 13b, 13c and formed with a pair of diametrically spaced and radially projecting ears 35. Three sockets 33a, 33b and 33c are spaced equally from one another around the holding plate 14 and each comprises a pair of diametrically spaced and downwardly opening slots 37 located at the ends of a pair of arcuate ribs 39, there being a groove 40 defined between the upper side of each rib and the top wall of the respective socket. Each slot 37 has an angular dimension just slightly greater than the angular dimension of the ear 35 of a mold while each groove 40 has an axial dimension just slightly greater and an angular dimension significantly greater than the corresponding dimensions of the ear. For a purpose to be explained subsequently, the slots 37 of the socket 33a extend parallel to the slots of the socket 33b (see FIG. 5) but the slots of the socket 33c extend at right angles to the slots of the sockets 33a and 33b.

Each of the molds 13a, 13b and 13c is connected to the holding plate 14 by turning the mold to a position in which its ears 35 are alined with the slots 37 of the respective socket 33a, 33b and 33c. The mold then is shifted upwardly to cause the collar 34 to telescope into the socket and to cause the ears to move upwardly within the slots to a position in which the lower surfaces of the ears are located above the upper sides of the ribs 39. Thereafter, the mold is turned ninety degrees to a locked position to cause the ears to enter the grooves 40. When the mold is in its locked position, the ears 35 hang from the ribs 39 and prevent the mold from being removed axially from the socket.

To remove the molds 13a, 13b and 13c from their respective sockets 33a, 33b and 33c, each mold is turned ninety degrees from its locked position to an unlocked position in which the ears 35 of the mold are alined angularly with the slots 37 in the socket. The molds then may be simply slipped downwardly out of the sockets. Accordingly, one set of molds may be removed from the holding plate 14 and replaced with another set in a relatively quick and easy manner. The lower molds may be secured to the lower holding plate in a similar fashion.

In carrying out the invention, means are provided for preventing the molds 13a, 13b and 13c from rotating to their unlocked positions after the couplings 30 have been telescoped in the sockets 33a, 33b and 33c and turned to their locked positions. These means preferably take the form of a simple locking key 45 (FIG. 2) which is effective to hold all three molds in their locked positions and which may be easily released from the molds when it is desired to turn the molds to their unlocked positions and remove the molds from the holding plate 14.

As shown in FIG. 2, the locking key 45 comprises an elongated horizontal bar 46 whose outer end is formed with a downturned finger tab 47. When the molds 13a, 13b and 13c are in their locked positions, the bar is adapted to fit into recesses 49 in the molds to prevent the molds from turning. Herein, each mold includes two diametrically spaced recesses 49 with each recess being in the form of a substantially L-shaped keyway having a flat vertical wall and an upwardly facing horizontal wall. The keyways 49 of each mold are located below and in vertical alinement with the ears 35 thereof and extend in the same general angular direction as the ears.

When the molds 13a and 13b are located in their locked positions in the sockets 33a and 33b, one of the keyways 49 in the mold 13a is located in direct side-by-side relation with one of the keyways in the mold 13b, the two keyways thus coacting to define a substantially U-shaped channel as shown in FIG. 3. When the mold 13c is in its locked position in the socket 33c, the two keyways 49 of that mold are located at right angles relative to the keyways of the molds 13a and 13b by virtue of the right angular relationship between the slots 37 of the socket 33c and the slots 37 of the sockets 33a and 33b. Also, one of the keyways of the mold 13c is located adjacent the inner end of the channel defined by the side-by-side keyways of the molds 13a and 13b (see FIGS. 2 and 4).

When all three molds 13a, 13b and 13c are in their locked positions, the bar 46 of the key 45 may be inserted endwise into the channel defined by the side-by-side keyways 49 of the molds 13a and 13b and, when the bar is fully inserted, its inner end portion moves into the keyway 49 of the mold 13c (see FIGS. 3 and 4). The sides of the bar engage the vertical walls of the side-by-side keyways of the molds 13a and 13b while the end of the bar engages the vertical wall of the keyway of the mold 13c. Thus, the bar of the key prevents all three molds from turning out of their locked positions so as to insure that the molds will remain securely attached to the holding plate 14. The key also insures that the cavities 16 of the upper molds will remain in angular alinement with the cavities of the lower molds if the cavities are of a non-circular shape so as to require angular alinement between the upper and lower molds.

When in its inserted position, the bar 46 of the key 45 rests on the horizontal walls of the keyways 49. To prevent accidential removal of the key, a detent in the form of a ball 50 (FIG. 3) is slidably mounted in the holding plate 14 and is biased downwardly by a spring 51. As the bar 46 moves into its fully inserted position, the ball snaps downwardly into a small socket in the upper side of the bar and presses the bar against the horizontal walls of the keyways 49 to retain the bar in place. By pulling outwardly on the finger tab 47, the detent action of the ball 50 may be overcome to permit the bar 46 to be removed endwise from the keyways and to enable the molds 13a, 13b and 13c to be turned to their unlocked positions.

Because of the molds 13a, 13b and 13c is formed with two diametrically spaced keyways 49, one keyway will be properly located to receive the bar 46 of the key 45 regardless of whether the mold is turned into its locked position in a clockwise direction or in a counterclockwise direction. Also, because of the right angular relationship between the slots 37 of the sockets 33a and 33b and the slots 37 of the socket 33c, the three molds may be identical to one another, any one of the three molds may be inserted into any one of the three sockets, and the keyways 49 of the three molds will always be positioned properly to receive the bar of the locking key.

I claim:

1. Molding apparatus comprising a plate member, a mold member, a socket, and a coupling, said socket being located in one of said members, said coupling being located on the other of said members, said socket being sized and shaped to telescopically receive said coupling when said mold member is in an unlocked position and to interlock with said coupling when said mold member is turned to a locked position, a second mold member, a second socket similar to said one socket, and a second coupling similar to said one coupling, said second socket being sized and shaped to telescopically receive said second coupling when said second mold member is in an unlocked position and to interlock with said second coupling when said second mold member is turned to an unlocked position, first and second recesses formed in said first and second mold members, respectively, and defining a channel when said mold members are in their locked positions, and a selectively releasable elongated key inserted into said channel and operable to prevent both of said mold members from turning from their locked positions to their unlocked positions.

2. Molding apparatus as defined in claim 1 in which said sockets and said couplings are of the bayonet type.

3. Molding apparatus comprising a plate, three angularly spaced bayonet-type sockets formed in one face of said plate, three molds, each of said molds having a bayonet-type coupling on one end thereof, said couplings being sized and shaped to telescope axially into said sockets when said molds are in unlocked positions and being held against axial removal from said sockets when said molds are turned to locked positions, first and second recesses in two of said molds and coacting with one another to define an elongated channel when said two molds are located in their locked positions, a third recess in a third one of said molds and located adjacent one end of said channel when said third mold is in its locked position, and an elongated key inserted releasably into said channel and having one end located in said third recess to prevent said molds from turning from their locked positions to their unlocked positions.

4. Molding apparatus as defined in claim 3 in which said key comprises a horizontal bar adapted for endwise insertion into said channel, and a detent on said one face of said plate and releasably engaging said bar to releasably prevent removal of said bar from said channel.

5. Molding apparatus as defined in claim 4 in which each of said recesses is defined by a generally L-shaped keyway having one upright wall and having one substantially horizontal wall.

6. Molding apparatus as defined in claim 5 in which said bar rests on the horizontal walls of said recesses when said bar is located in said channel.

7. Molding apparatus as defined in claim 3 in which each of said molds is formed with two diametrically spaced recesses, each of said recesses being defined by a generally L-shaped keyway having one upright wall and having one substantially horizontal wall.

8. Molding apparatus as defined in claim 3 in which each of said sockets is formed with a pair of diametrically spaced slots, the slots of a first one of said sockets extending parallel to the slots of a second one of said sockets, and the slots of a third one of said sockets extending at right angles to the slots of said first and second sockets.

9. Molding apparatus as defined in claim 8 in which each of said molds is formed with two diametrically spaced recesses, each of said recesses being defined by a generally L-shaped keyway having one upright wall and having one substantially horizontal wall.

* * * * *